Patented Jan. 21, 1930

1,744,180

UNITED STATES PATENT OFFICE

EDUARD TSCHUNKUR AND ALBERT KLAMROTH, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE PURIFICATION OF SYNTHETIC METHYL ALCOHOL

No Drawing. Application filed October 12, 1927, Serial No. 225,838, and in Germany October 27, 1926.

The present invention concerns a process for the purification of synthetic methyl alcohol by which the synthetic methyl alcohol produced or individual fractions obtained by the distillation thereof, are subjected to a treatment with permanganate, if desired followed by the addition of organic bases and zinc chloride.

Synthetic methyl alcohol obtained from oxides of carbon and hydrogen occasionally possesses a peculiar unpleasant odor, due to the presence of small quantities of various impurities. This odor is different from that of methyl alcohol (wood spirit) obtained by the carbonization of wood. These impurities usually interfere with the purification of synthetic methyl alcohol and individual fractions thereof obtained by distillation to such an extent, that the customary methods of purification used for wood spirit, such for example, as fractional distillation by means of a fractionating column, are generally not by themselves, sufficient to produce methyl alcohol of a high degree of purity as regards boiling point, stability to permanganate, odor, etc.

According to the present invention this disadvantage of synthetic methyl alcohol is eliminated by subjecting the crude synthetic methyl alcohol or individual distillation fractions thereof to a treatment with permanganate either before, during or after the fractional distillation thereof. The amounts of permanganate necessary for this purification are very small. Accordingly it is not necessary to use permanganate in a quantity sufficient to destroy all the impurities as are oxidizable at ordinary temperature, an addition of 0.1 to 0.3 per cent of permanganate calculated on the crude methyl alcohol suffices, for example to improve the quality of the same to a very marked extent. The process is extremely simple. The requisite quantity of potassium permanganate is dissolved in water and crude methyl alcohol or individual fractions thereof from the distillation of the same are gradually added to this solution with stirring at ordinary temperature. The purification process commences immediately.

With methyl alcohol considered particularly impure it is advantageous to add to the methyl alcohol or the individual distillation fractions thereof after the previous treatment with permanganate, small quantities (about 0.3 to 0.5 per cent calculated on the methyl alcohol used) of such an organic base as is not volatile with methyl alcohol vapors, such for example, as phenylene diamine, toluylene diamine, amino phenols, phenyl hydrazine and the like. These bases act as condensing agents at elevated temperatures on various impurities contained in the methyl alcohol, and in distilling the methyl alcohol, these impurities remain behind.

The following example will serve to illustrate our invention:

*Example.*—To 20,000 kgs. of methyl alcohol is gradually added (during about one hour) at ordinary temperature in a vessel provided with stirrer a solution of 30 kgs. of potassium permanganate in water with stirring. The mixture is then fractionated in known manner in a fractionating column of customary construction with or without the addition of water and organic bases.

As already stated the crude methyl alcohol which has been thus treated with potassium permanganate gives on distillation higher yields of pure methyl alcohol and a considerably purer product than that not subjected to the preliminary chemical treatment.

In such cases in which the methyl alcohol contains in addition to the impurities before mentioned, ammonia or organic bases it is purified from the same by treatment with zinc chloride or solutions of zinc chloride subsequently to the treatment with permanganate, and then distilled.

In this manner methyl alcohol is obtained which is completely free from ammonia and organic bases. The amount of zinc chloride necessary for the purification naturally depends on the ammonia content of the methyl alcohol. Part of the calculated amount of zinc chloride may be replaced by an equivalent quantity of hydrochloric acid, with the same result.

We claim:

1. In the process for the purification of synthetic methyl alcohol the step which comprises subjecting synthetic methyl alcohol to a treatment with permanganate.

2. In the process for the purification of synthetic methyl alcohol the step which comprises subjecting synthetic methyl alcohol to a treatment with permanganate and then adding an organic base which is not volatile with the alcoholic vapors.

3. In the process for the purification of synthetic methyl alcohol the step which comprises subjecting synthetic methyl alcohol to a treatment with permanganate and zinc chloride.

4. In the process for the purification of synthetic methyl alcohol the step which comprises subjecting methyl alcohol to a treatment with permanganate, and then with a solution of zinc chloride.

In testimony whereof we have hereunto set our hands.

EDUARD TSCHUNKUR.
ALBERT KLAMROTH.